United States Patent
Heaton et al.

(10) Patent No.: US 6,618,217 B2
(45) Date of Patent: Sep. 9, 2003

(54) SYSTEM AND METHOD FOR DETERMINING THE POSITION OF A DEVICE

(75) Inventors: Mark W. Heaton, Irving, TX (US); David P. Magee, Plano, TX (US); Michael T. DiRenzo, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/256,467

(22) Filed: Feb. 23, 1999

(65) Prior Publication Data

US 2003/0133221 A1 Jul. 17, 2003

(51) Int. Cl.[7] .................. G11B 5/596; G11B 21/02; G11B 21/24
(52) U.S. Cl. .............. 360/77.03; 360/75; 360/294.5
(58) Field of Search .................. 360/78.12, 78.15, 360/294.4, 75, 77.16, 77.02, 77.03, 78.04, 78.05, 78.11, 294.5; 310/311, 365, 366

(56) References Cited

U.S. PATENT DOCUMENTS

| 5,682,076 A | * | 10/1997 | Zumeris ............ 360/77.16 X |
| 5,726,480 A | * | 3/1998 | Pister .................. 257/415 |
| 5,929,326 A | * | 7/1999 | Imaino et al. ............ 73/105 |
| 6,079,088 A | * | 6/2000 | Schaenzer et al. ....... 29/25.35 |
| 6,163,434 A | * | 12/2000 | Zhang ................... 360/294.5 |
| 6,402,968 B1 | * | 6/2002 | Yazdi et al. ................ 216/2 |
| 6,472,244 B1 | * | 10/2002 | Ferrari et al. .............. 438/53 |

OTHER PUBLICATIONS

Y. Soeno, S. Ichikawa, T. Tsuna, Y. Sato and I. Sato, "Piezoelectric Piggy–Back Microactuator for Hard Disk Drive," Advanced Products Development Center, TDK Corporation.

David A. Horsley, Naiyavudhi Wongkomet, Roberto Horowitz, and Albert P. Pisano, "Design and Feedback Control of Electrostatic Actuators for Magnetic Disk Drives," *Solid–State Sensor and Actuator Workshop*, Hilton Head Island, South Carolina, pp. 120–123, Jun. 8–11, 1998.

* cited by examiner

*Primary Examiner*—Andrew L. Sniezek
(74) *Attorney, Agent, or Firm*—W. Daniel Swayze, Jr.; W. James Brady; Frederick J. Telecky, Jr.

(57) ABSTRACT

A position sensor includes a stationary platform and a moveable platform. The position sensor further includes at least one beam coupling the moveable platform to the stationary platform. The at least one beam includes piezoresistive material that is positioned tolprovide an indication of a movement of the moveable platform relative to the stationary platform.

10 Claims, 2 Drawing Sheets

SYSTEM AND METHOD FOR DETERMINING THE POSITION OF A DEVICE

TECHNICAL FIELD OF THE INVENTION

This invention relates generally to position sensors and more particularly to a position sensor for a microactuator in a mass storage device.

BACKGROUND OF THE INVENTION

Mass storage devices such as hard disk drive systems generally include a magnetic storage media for storing information, a spindle motor for rotating the storage media, a magnetic read/write head for reading information from or writing information to the magnetic storage media, and an actuator for positioning the read/write head over the storage media. A control system associated with the actuator controls the movement of the actuator.

The read/write head is often positioned on an arm. This arm is positioned using the actuator mentioned above. However, such a system only provides coarse positioning of the read/write head. In order to further increase the data storage capacity of hard disk drives, the size of each data bit is constantly being reduced. The reduced data bit size requires increased accuracy in the positioning of the read/write head over the storage media. In order to provide finer adjustment of the position of the read/write head, microactuators are used that are positioned on an extreme end of the arm, where the read/write head is positioned.

The positioning force created by the microactuator can take many forms. For example, past actuator designs have used electrostatic, ferromagnetic, and piezoresistive actuation. An example system is described in "Design and Feedback Control of Electrostatic Actuators for Magnetic Disk Drives" by David A. Horsley, et. al. This paper was published at the Solid-State Sensor and Actuator Workshop, Jun. 8–11, 1998.

A problem that arises from the use of such a microactuators is determining the precise location of the read/write head in response to positioning by the microactuator. Position sensors or "pick-offs" are used for this purpose.

In addition to hard disk drives, there are numerous other applications that require precise positioning information.

SUMMARY OF THE INVENTION

Accordingly, a need has arisen for an apparatus for determining the precise position of a device, and more specifically, a read/write head in a hard disk drive. The present invention provides such a system and method for determining the position of a device.

According to one embodiment of the invention, a position sensor includes a stationary platform and a moveable platform. The position sensor further includes at least one beam coupling the moveable platform to the stationary platform. The at least one beam includes piezoresistive material that is positioned to provide an indication of a movement of the moveable platform relative to the stationary platform.

According to another embodiment of the invention, a hard disk drive system includes a disk storage media for storing information. The hard disk drive system also includes an arm operable to move over the disk storage media and an actuation system for positioning the arm relative to the disk storage media. Furthermore, the hard disk drive system includes a stationary platform coupled to an end of the arm and a head coupled to the stationary platform by a pair of beams. The head is used for recording and reproducing data in the disk storage media. A microactuator is used for positioning the head relative to the stationary platform, and piezoresistive material is positioned on the pair of beams to provide an indication of this movement of the head.

Embodiments of the present provide numerous technical advantages. For example, in one embodiment of the invention, a position sensor incorporates piezoresistive material to determine the precise location of a read/write head in a hard disk drive. Such precise location information allows for very fine adjustments in the position of the read/write head. In turn, this allows for storage of data on a hard disk drive at greater densities.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 5B of the drawings, like numerals being used for like and corresponding parts of the various drawings.

Figure 1:
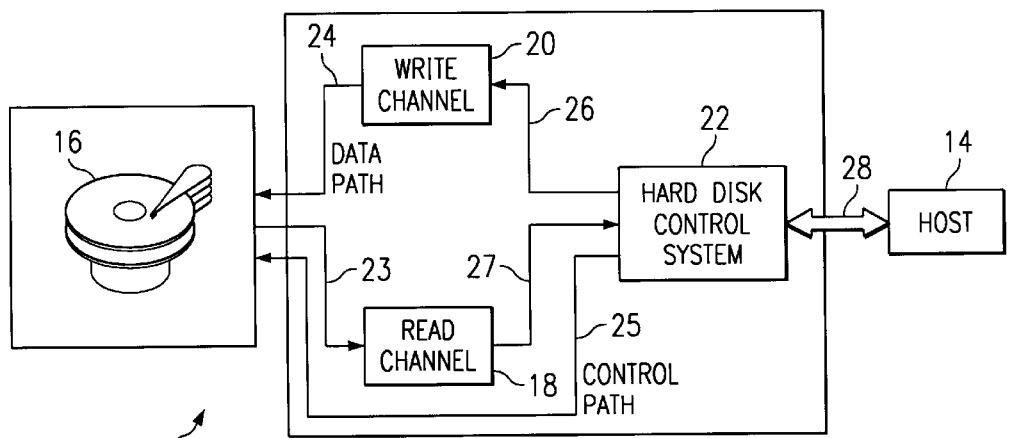
FIG. 1 is a block diagram illustrating a portion of a hard disk drive system, including a disk drive apparatus.

FIG. 1 is a block diagram of a hard disk drive system 12 used for retrieving data during read operations and for storing data during write operations. Hard disk drive system 12 interfaces and exchanges data with a host 14 during read and write operations. Hard disk drive system 12 includes a disk drive apparatus 16, a read channel 18, a write channel 20, and a hard disk control system 22.

Disk drive apparatus 16 is used to magnetically store data. Disk drive apparatus 16 is shown in greater detail in FIG. 2. Read channel 18, write channel 20, and hard disk control system 22 are used to process data that are read from and written to disk drive apparatus 16. Hard disk control system 22 also controls various operations of hard disk drive system 12. Write channel 20 is coupled to disk drive apparatus 16 through a write data path 24. Read channel 18 is coupled to disk drive apparatus 16 through a read data path 23. Read channel 18 is coupled to hard disk control system 22 through a read data path 27. Write channel 20 is coupled to hard disk control system 22 through a write data path 26. Host 14 exchanges data with hard disk control system 22 through data bus 28.

During read operations, read channel 18 receives an analog data signal from disk drive apparatus 16 through data path 23. Read channel 18 conditions, decodes, and formats the analog data signal and provides a digital data signal to hard disk control system 22 through data path 27. Read channel 18 may include any of a variety of circuit modules such as an automatic gain control circuit, a low pass filter, a variable frequency oscillator, a sampler, and a synchronization field detection circuit.

During write operations, write channel 20 receives a digital data signal from hard disk control system 22 through data path 26. Write channel 20 reformats and codes the digital data signal for storage and provides an analog data signal to disk drive apparatus 16 through data path 24. Write channel 20 may include any of a variety of circuit modules such as a register, a scrambler, a phase locked loop, an encoder, a serializer, and a write precompensation circuit.

Hard disk control system 22 is used to control various operations of hard disk drive system 12 and to exchange digital data with host 14, including disk drive apparatus 16. Hard disk control system 22 generates a control signal that is received by disk drive apparatus 16. Hard disk control system 22 may include a microprocessor, a random access memory, a read-only memory, and a disk controller (not explicitly shown). The microprocessor, random access memory, read-only memory, and disk controller together provide control and logic functions to read channel 18, write channel 20, and disk drive apparatus 16 so that data can be received from host 14, stored, and later retrieved and provided back to host 14.

Figure 2:
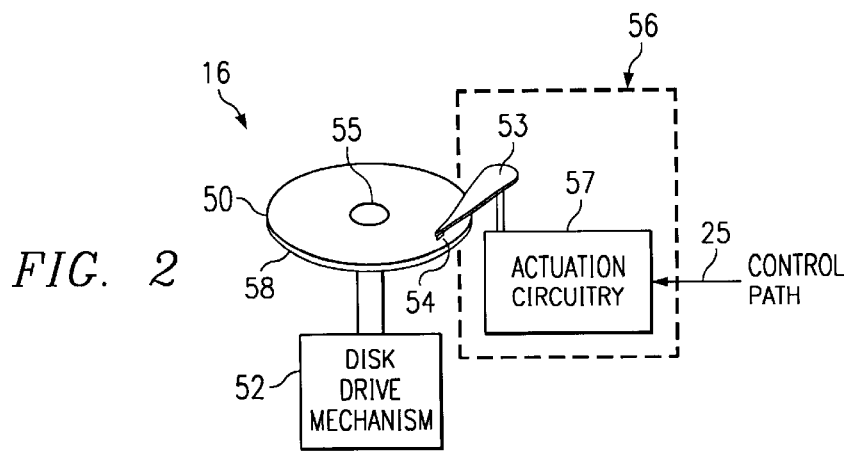
FIG. 2 is a schematic diagram illustrating a partial view of the disk drive apparatus of FIG. 1, showing the control of the movement of a read/write head by a control system.

FIG. 2 is a schematic diagram of disk drive apparatus 16 shown in FIG. 1. Disk drive apparatus 16 is used to magnetically store and retrieve data. Disk drive apparatus 16 includes a storage media 50, a disk drive mechanism 52, a read/write head 54, and an actuation system 56. Actuation system 56 includes a read/write head arm 53 and actuation circuitry 57 for positioning read/write head arm 53. Actuation system 56 further includes a microactuator (not explicitly shown) located on the tip of read/write head arm 53. This microactuator is used for fine positioning of read/write head 54, and is described in greater detail in conjunction with FIG. 3.

In one embodiment, storage media 50 is a rotating magnetic disk or platter that stores data represented as magnetic transitions on a surface of the magnetic platter. Although storage media 50 is illustrated in FIG. 2 as a single magnetic platter, disk drive apparatus 16 can include multiple magnetic disks or platters. Storage media 50 illustrated in FIG. 2 has a center 55 and an outer edge 58.

Disk drive mechanism 52 rotates storage media 50 at a desired rate. An example disk drive apparatus 16 uses disk drive mechanism 52 that rotates storage media 50 at a rate of approximately 10,000 revolutions per minute. Disk drive mechanism 52 may be any of a number of available mechanisms operable to rotate storage media 50 such as a spindle motor.

Read/write head 54 stores and retrieves data from a single surface of storage media 50. Although only one read/write head 54 is illustrated in FIG. 2, a second read/write head can be provided to store data to and retrieve data from the opposite side of the magnetic platter illustrated in FIG. 2. Also, if multiple magnetic platters are used for storage media 50, read/write heads can be provided for each surface of each magnetic platter. Read/write head 54 may be any of a number of available read/write heads such as magneto-resistive heads.

During read operations, read/write head 54 deciphers the magnetic transitions stored on storage media 50. Read/write head 54 then sends an analog data signal to read channel 18 through read data path 23 (not explicitly shown in FIG. 2). During write operations, read/write head 54 receives an analog data signal from write channel 20 through write data path 24 (not explicitly shown in FIG. 2). Read/write head 54 then records the analog data signal as magnetic transitions on storage media 50.

Read or write operations cannot occur until read/write head 54 is in an appropriate location over the surface of storage media 50. Actuation circuitry 57 coarsely positions read/write head 54 by moving read/write head arm 53 to the appropriate location in response to receiving control signal 25 from hard disk control system 22. In addition, the microactuator can be used to finely position read/write head relative to read/write head arm 53. In a series of read and write operations, actuation circuitry 56 moves read/write head 54 back and forth over the surface of storage media 50.

According to the teachings of the present invention, a position sensor is described below that allows one to determine the exact position of read/write head 54 in response to positioning by the microactuator. The use of the microactuator and the position sensor allows the precise positioning of read/write head 54 over storage media 50. This precise positioning, in turn, allows for storage of data on storage media 50 at greater densities.

Figure 3:
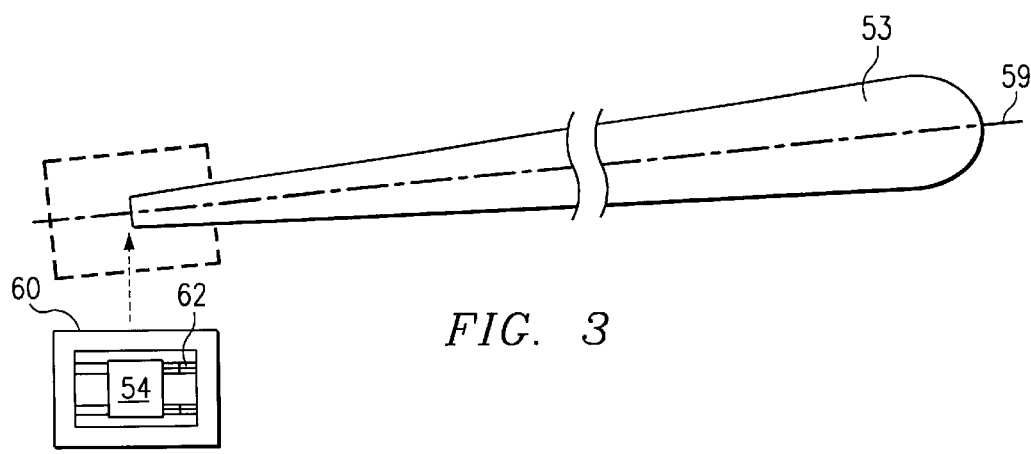
FIG. 3 is an enlarged drawing of the hard disk drive of FIG. 2 showing in greater detail an arm and the read/write head positioned on the arm of the hard disk drive.

FIG. 3 is an enlarged drawing of the hard disk drive of FIG. 2 showing in greater detail read/write head arm 53 and read/write head 54 positioned on arm 53. In general, a movable platform is coupled to a stationary platform 60 using a set of beams 62, which are illustrated in greater detail in FIG. 4A through 5B. In the illustrated embodiment, the movable platform is specifically read/write head 54. Stationary platform 60 is coupled to read/write head arm 53. Stationary platform 60 is preferably constructed of polysilicon; however, other types of material may be used. Through the use of beams 62, read/write head 54 is restricted from moving in all directions except along the axis generally perpendicular to the longitudinal axis 59 of read/write head arm 53. A microactuator (not explicitly shown) applies a force to read/write head 54 in order to move it along this axis of movement.

Figure 4A:
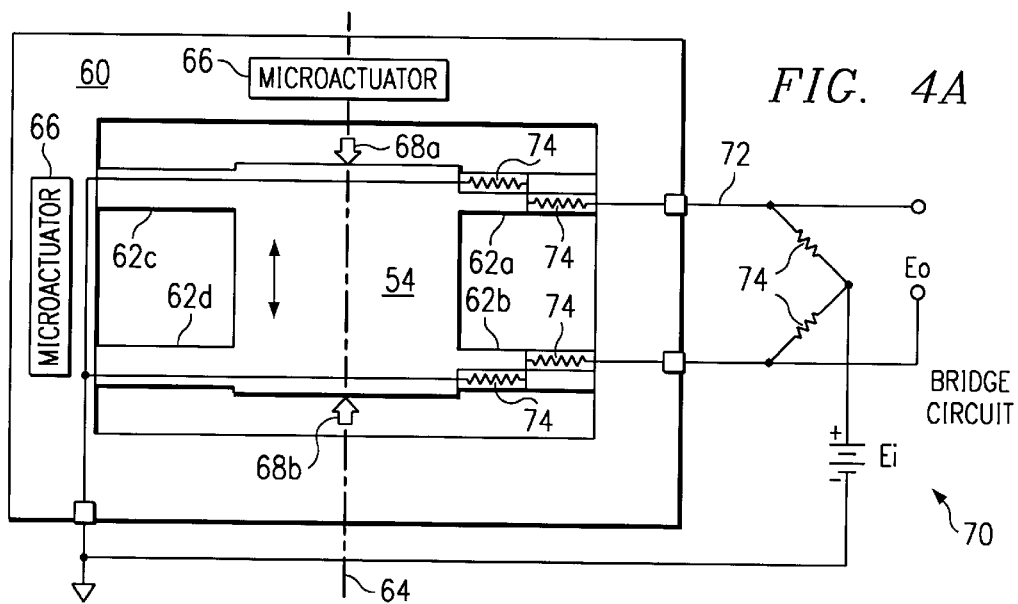
FIG. 4A is a top view of the read/write head illustrated in FIG. 3, and shown on a stationary platform positioned on the arm illustrated in FIG. 2 in an undeflected,position.

FIG. 4A is a plan view of the read/write head and stationary platform illustrated in FIG. 3 shown in an undeflected position. As described above, microactuator 66 is operable to move read/write head 54 along axis 64. Microactuator 66 is depicted in FIG. 4A in two alternative positions. Microactuator 66 can be located in any position which allows it to exert an actuating force on read/write head 54. Various types of microactuators may be used to apply such an actuating force to read/write head 54. Such microactuators can employ electrostatic, ferromagnetic, piezoresistive or other various types of actuating forces. No matter what type of microactuator is used, the operation of microactuator 66 can be generalized as the application of forces 68*a* and 68*b* to read/write head 54. Forces 68*a* and 68*b* operate to move read/write head 54 in either direction along axis 64. Forces 68*a* and 68*b* can be applied at any point on read/write head 54, and can also be distributed over an area of read/write head 54.

Figure 4B:
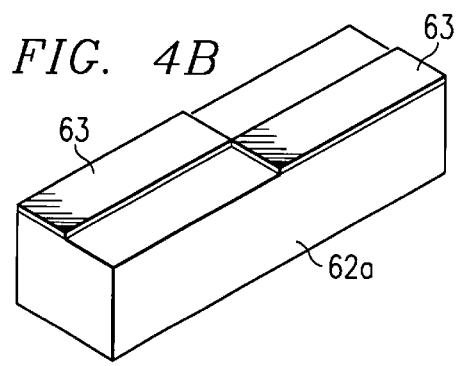
FIG. 4B is an isometric view of a beam illustrated in FIG. 4A.

As described above, read/write head 54 is coupled to stationary platform 60 by beams 62. Beams 62a and 62b are preferably made from polysilicon; however, other materials can be used. A thin layer 63 of polysilicon doped with boron is applied to certain areas of the top surface of beams 62a and 62b. More specifically, in one embodiment of the present invention, polysilicon is doped with $10^{19}$ particles/$cm^{+3}$ of boron. However, it should be understood that other materials having piezoresistive properties can also be used. The positioning of layers 63 is depicted in FIGS. 4A and FIG. 4B. If the top of beams 62a and 62b are divided into imaginary quadrants, layers 63 occupy two of the four quadrants. The placement of layers 63 on beam 62a is generally opposite of the placement on beam 62b.

Layers 63 on beams 62a and 62b are placed such that when a force 68a or 68b is applied to read/write head 54 in the direction of axis 64, layers 63 are subjected to either substantially compressive or substantially tensile forces. Since layers 63 are placed in generally opposite positions on beams 62a and 62b, if layers 63 on beam 62a are experiencing tension, layers 63 on beam 62b will experience compression. This difference in applied force in beams 62a and 62b allows the direction of movement of read/write head 54 along axis 64 to be ascertained. This will be described in more detail in conjunction with FIGS. 5A and 5B.

It should be noted that although FIG. 4A shows the use of two beams 62a and 62b, a single beam (not explicitly shown) may be used in an alternate embodiment. In such an embodiment, the piezoresistive layers may cover an entire surface of the single beam. For example, two piezoresistive layers may be placed in a similar configuration as layers 63 are positioned on beam 62a in FIG. 4A, and two other layers may be placed on the same beam in a similar configuration as layers 63 are positioned on beam 62b. In so positioning the layers, the upper surface of the single beam is substantially covered.

As can be seen from FIG. 4B, the thickness of layers 63 in this embodiment is very small (more than an order of magnitude smaller) in comparison to the thickness of beams 62a and 62b. It should be understood that layers could also be positioned on any other surface of beams 62a and 62b. For example, layers 63 could be placed along the bottom or along either side of beams 62a and 62b.

Movement of read/write head 54 along axis 64 allows for precise positioning of read/write head 54 over storage media 50. When force 68a or 68b is applied to read/write head 54, it is important to know the exact position of read/write head 54 along axis 64 in relation to stationary platform 60. In order to determine the precise position of read/write head 54, a positioning system 70 is employed. In the illustrated embodiment, positioning system 70 includes a bridge circuit 72. Bridge circuit 72 is a Wheatstone bridge circuit comprising a set of resistors 74. In particular, layers 63 on beams 62a and 62b serve as resistors 74 in bridge circuit 72. The doped polysilicon that comprises layers 63 has piezoresistive properties which cause the resistance of layers 63 to change when stress is applied to layers 63. As will be described in more detail below, bridge circuit 72 is used to measure this change in resistance of layers 63 to determine the location of read/write head 54. It should be understood, however, that any suitable method of determining the change in resistance of layers 63 can be implemented.

Figure 5B:
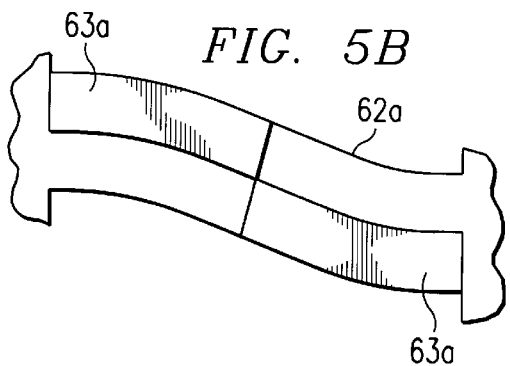
FIG. 5B shows an enlarged view of a beam illustrated in FIG. 5A, showing areas of tension and compression in the beam.
Figure 5A:
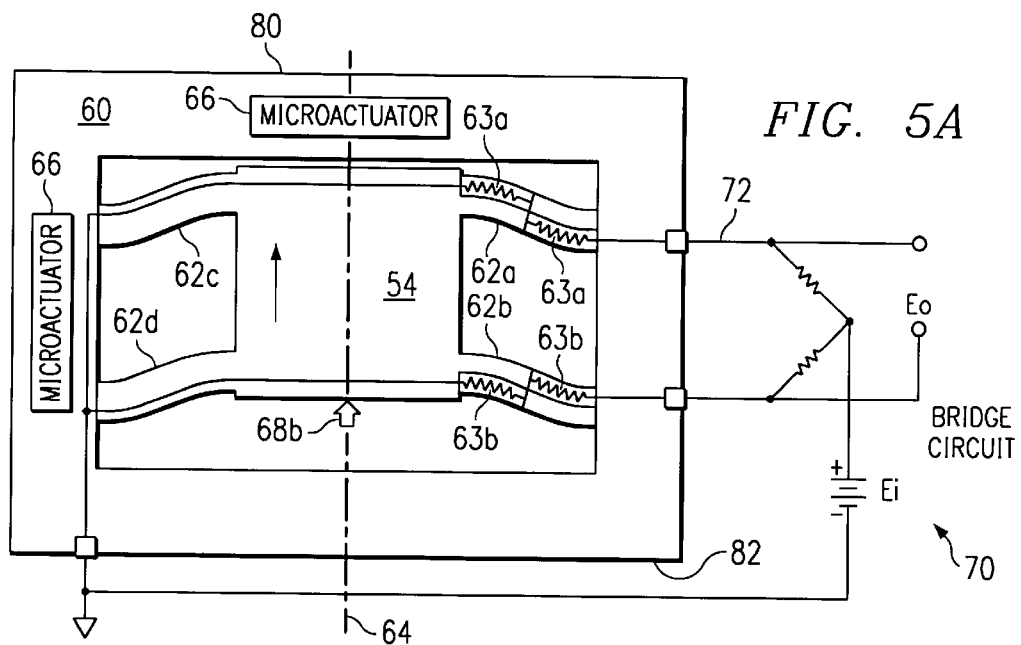
FIG. 5A is a top view of the read/write head illustrated in FIG. 3 shown on a stationary platform positioned on the arm illustrated in FIG. 2 in an deflected position.

FIG. 5A is a plan view of the read/write head and stationary platform illustrated in FIG. 3, shown in a deflected position. Read/write head 54 has been deflected along axis 64 by force 68b. As mentioned above, it is important to be able to know exactly how far and in which direction read/write head 54 has moved along axis 64. The precise location of read/write head 54 is measured using the piezoresistive characteristics of doped polysilicon layers 63 on beams 62a and 62b. As read/write head 54 moves along axis 64, beams 62 are deformed. Such deformation of beam 62a is illustrated in FIG. 5B.

As read/write head 54 moves towards side 80 of stationary platform 60 along axis 64, the quadrants of beam 62b having doped polysilicon layers 63b are subject to a compressive force. Since layers 63b are attached to beam 62b, this compressive force is also applied to layers 63b. It should be noted that since layers 63 are much thinner than beam 62b, layers 63b do not significantly alter the deformation of beam 62b. When the compressive force is applied to layers 63b of beam 62b, layers 63b are compressed and shortened. This compression and shortening causes the resistance of layers 63b to decrease. Bridge circuit 72 runs through layers 63b and is used to measure this change in resistance.

Similarly, when read/write head 54 moves towards side 80 of stationary platform 60 along axis 64, the quadrants of beam 62a having doped polysilicon layers 63a are subject to a tensile force. This tensile force elongates layers 63a. This tension and elongation increases the resistance of layers 63a, through which bridge circuit 72 runs. Bridge circuit 72 is used to measure this change in resistance of layers 63a. By determining the change in resistance of layers 63a and 63b, as described above, the precise position of read/write head 54 can be determined. It should be noted that through the use of the Wheatstone bridge, any changes in resistance of layers 63 due to temperature changes are canceled out. Therefore, the measured change in resistance in only a function of the force applied to layers 63.

Alternatively, if read/write head 54 is moved towards side 82 of stationary platform 60 by microactuator 66, the same process as described above is used to determine the precise position of read/write head 54. In this case, the only change from the above description is that layers 63a of beam 62a undergo compression, whereas layers 63b of beam 62b undergo tension. This is the opposite of the situation described above. It is this difference in the type of stress applied to layers 63a and 63b that indicates the direction read/write head 54 has moved along axis 64. Thus, in the illustrated embodiment, if the resistance of layers 63a of beam 62a increases, thus indicating tension, and the resistance of layers 63b of beam 62b decreases, thus indicating compression, then it can be ascertained that the read/write head has moved towards side 80 of stationary platform 60. The opposite change in resistance of layers 63a and 63b would indicate that read/write head has moved towards side 82 of stationary platform 60. For these reasons, layers 63 are not applied to the entire surface of beams 62. If layers 63 were so applied, the tensile and compressive forces on beams 62 would effectively cancel each other out, and the direction of movement of read/write head 54 along axis 64 could not be ascertained.

In addition to the direction of movement, the magnitude of the movement of read/write head 54 is also required. The piezoresistive characteristics of the doped polysilicon are well documented. These characteristics are used to determine the magnitude of deformation of layers 63 that corresponds to the measured change in resistance of layers 63. This determination can be made either through theoretical analysis, empirical testing and calibration, or a combination of the two. Knowing the magnitude and direction of deformation of layers 63 enables one to determine the magnitude and direction of movement of the end of beams 62 that are coupled to read/write head 54. This information can then be used to determine the magnitude and direction of movement of read/write head 54 relative to stationary platform 60, since read/write head 54 is attached to beams 62.

Although the present invention and its advantages have been described in detail, it should be understood that various changes, substitutions, and alterations can be made therein without departing from the spirit and scope of the present invention as defined by the appended claims. For example, it should be understood that the position sensor described above can be implemented in numerous other applications besides its use in a mass storage device. Any application that requires precise positioning of an object could conceivably implement the present invention. In general, the present invention can be used to measure the movement of a movable platform coupled to a stationary platform by one or more beams comprising piezoresistive material.

What is claimed is:

1. A microactuator position sensor comprising:

a stationary platform;

a moveable platform;

at least one beam coupling the moveable platform to the stationary platform; and wherein the at least one beam comprises a microactuator having piezoresistive material selectably positioned to provide an indication of a movement of the moveable platform relative to the stationary platform, wherein the microactuator comprises:

a surface comprising a first quadrant and a second quadrant, the second quadrant located diagonally from the first quadrant; and a piezoresistive material generally overlying the first and second quadrants.

2. The microactuator position sensor of claim 1, wherein the piezoresistive material is positioned such that a stress applied to the piezoresistive material on the at least one beam in response to a movement of the movable platform is either substantially compressive or substantially tensile.

3. The microactuator position sensor of claim 1, wherein piezoresistive material is positioned on the at least one beam in a layer perpendicular to a plane of movement of the movable platform.

4. The microactuator position sensor of claim 1, wherein the piezoresistive material is polysilicon doped with boron.

5. The microactuator position sensor of claim 1, further comprising a Wheatstone bridge circuit coupled to the piezoresistive material selectably positioned on the at least one beam.

6. A hard disk drive system comprising:

a disk storage media for storing information;

an arm operable to move over the disk storage media;

a microactuator actuation system for positioning the arm relative to the disk storage media;

a stationary platform coupled to an end of the arm;

a head for recording and reproducing data in the disk storage media, the head coupled to the stationary platform by a pair of beams;

a microactuator for positioning the head relative to the stationary platform and located on said beam; and wherein the microactuator comprise piezoresistive material positioned to provide an indication of a movement of the head relative to the stationary platform, wherein the pair of beams further comprise:

a surface comprising a first quadrant and a second quadrant, the second quadrant located diagonally from the first quadrant; and a piezoresistive material generally overlying the first and second quadrants.

7. The hard disk drive system of claim 6, wherein the piezoresistive material is positioned such that a stress applied to the piezoresistive material on the pair of beams in response to a movement of the head is either substantially compressive or substantially tensile.

8. The hard disk drive system of claim 6, wherein piezoresistive material is positioned on the pair of beams in a layer parallel to a plane of movement of the head.

9. The hard disk drive system of claim 6, wherein the piezoresistive material is polysilicon doped with boron.

10. The hard disk drive system of claim 6, further comprising a Wheatstone bridge circuit coupled to the piezoresistive material selectably positioned on the pair of beams.

* * * * *